March 22, 1938.    F. PORSCHE    2,112,112
SPRINGING MEANS FOR VEHICLES
Filed June 3, 1936    2 Sheets-Sheet 1
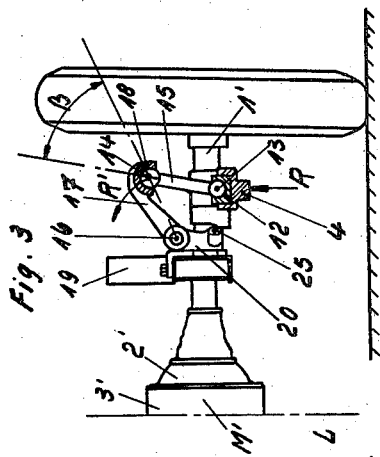
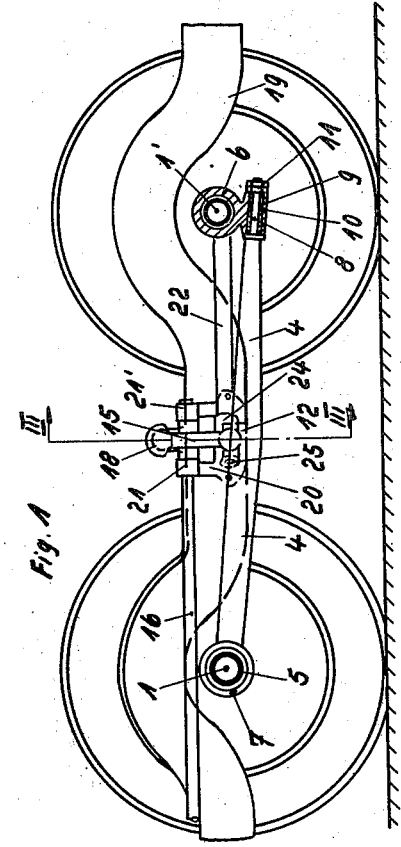
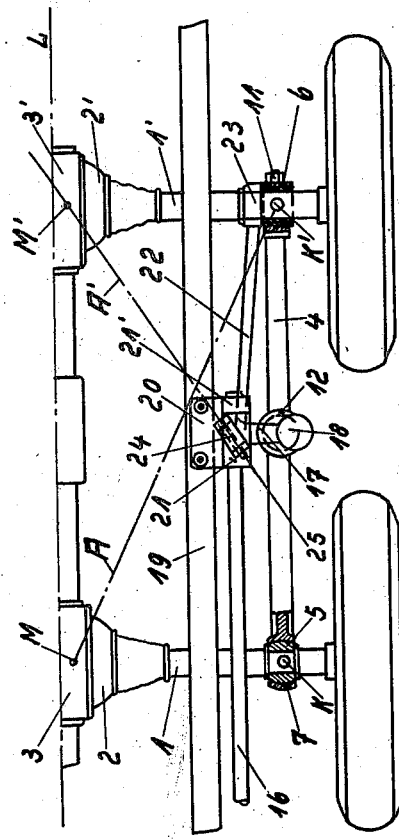
Ferdinand Porsche
Inventor
By A. A. Klicka
Attorney

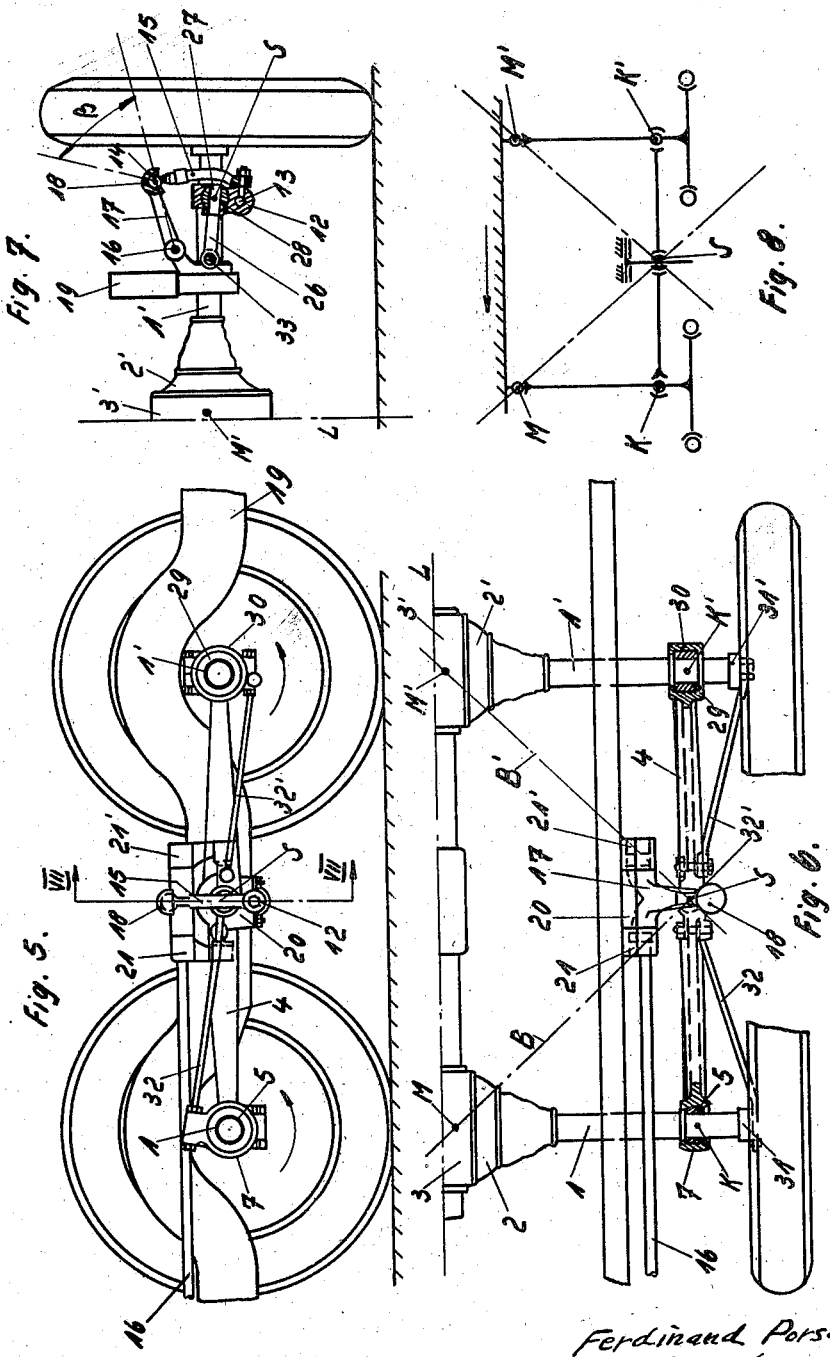

Patented Mar. 22, 1938

2,112,112

UNITED STATES PATENT OFFICE 2,112,112

SPRINGING MEANS FOR VEHICLES

Ferdinand Porsche, Stuttgart, Germany

Application June 3, 1936, Serial No. 83,279
In Germany October 19, 1934

10 Claims. (Cl. 280—124)

This invention relates to springing means for vehicles, and more particularly to springing means for vehicles having a plurality of substantially parallel half-axles lined one behind the other.

An object of this invention is the provision of improved springing means for poly-axled vehicles.

Another object of this invention is to provide adequate springing for vehicles having a plurality of axles by means of a single spring.

A further object of this invention is the provision of a single spring for a plurality of vehicle wheel axles which will provide effective independent springing for each axle.

A still further object of this invention is the provision of progressive springing of a plurality of vehicle axles by means of a single spring, whereby a proportionality between the load and the severity of the springing can be maintained.

I may attain these and other objects as hereinafter outlined by various constructions shown by way of example in the annexed drawings, wherein:

Fig. 1 is a side elevation of the general axle arrangement;

Fig. 2 is a corresponding plan view;

Fig. 3 is a cross-sectional view taken along the lines III—III in Fig. 1;

Fig. 4 is a reduced diagrammatic view of the axle arrangement in a somewhat different form;

Fig. 5 is a side elevation of a second form of the invention;

Fig. 6 is the corresponding plan view;

Fig. 7 is a cross-sectional view along the lines VII—VII of Fig. 5; and

Fig. 8 is a reduced diagrammatic view of the modified axle arrangement.

Figs. 1 to 3 inclusive are illustrative of a first form which the axle and springing arrangement may take. As therein shown two half axles 1, 1' lying one behind the other are swung from the vehicle frame about points M and M', being the centers of movement of joints within the respective axle housings 3, 3'. Said housing are closed by covers such as 2, 2'. A connecting link or bar 4 is connected to the axle 1 by pivot and bearing means 5 and 7, comprising a spherical joint, and is connected to the axle 1' by connecting head 6. Connecting head 6 includes an opening 10 through which a reduced portion 8 of the bar 4 is inserted and preferably supported therein by a resilient bearing sleeve 9. Means such as nuts 11 are attached to the extreme end of the reduced portion 8 and act to hold the bar to the connecting head 6. The resilient means 9 is preferably but not necessarily made of rubber. At approximately the center of the bar 4, midway between the half axles 1, 1', is placed a socket 12 adapted to receive the spherical end 13 of a strut 15 whose opposite spherical end 14 fits in a corresponding bearing socket 18 of an arm 17. Rotary spring means shown as a torsion bar 16 extends lengthwise generally parallel to the frame member 19 and is adjustably connected thereto at one end by any suitable means (not shown). The other end of the torsion bar is journaled in a bracket member 20 attached to the frame member 19 and provided with bearing member 21, 21'. The bar 16 is firmly connected to spring arm 17. A strut 22 is firmly fastened to the half axle 1' preferably at a point near the connecting head 6 and at its other end 24 is pivotally connected relative to the frame as to the bracket member 20 by means of a pivot 25. The bearing 25 may be lined with rubber so as to form a resilient joint.

Through the above outlined means the half axle 1' will be swung about a theoretical axis A' which is determined by the point M' and the pivot 25. If this axle swings upwardly in the direction R about the midpoint K of the joint 5, 7 the spring link 17 will turn in the direction R', thus increasing the tension of the spring rod 16.

The axle 1 is swingable relative to the frame about an approximately horizontal theoretical axis A which is determined by the point M and the point K'. The connecting means 6, 8, 9, and 10 due to its resilience will form a universal joint corresponding to the spherical pivotal connection 5, 7. If the half axle 1 swings upwardly, the coupling bar 4 will move in the direction R about the midpoint K' as a pivot, and likewise the spring arm 17 will turn in the direction R', thus increasing the tension of the spring rod 16. Since the resulting forces R and R' do not act in the same direction, the strut 15 will move about its axis and will thus accommodate the spacial displacement of the bar 4 and the arm 17.

If only one axle is deflected the motion of the point K or K' is about double that of the motion of the linkage points 13, 14. In the case of the common deflection of both half axles 1, 1' there are two possibilities: If both half axles 1, 1' are swung in the same direction, movement of the linkage points K, K' will be accompanied by corresponding movement of the linkage points 13 and 14; if on the contrary, the two half axles 1, 1' swing in opposite directions no substantial movement of the linkage points 13 and 14 will take place as in this case the bar 4 will tilt freely about the points 13 and 14. In commonly springing both half axles 1, 1', it must be assumed that the bar 4 can slip axially in the flexible connection 8, 10 so that the forward half axle 1 need not react upon the rear half axle 1'. In this manner the reaction of one half axle upon the other is avoided and each will in effect be independently sprung. By appropriate positioning of the pivot 25 the theoretical axis of the half axle 1' may be made to pass through the point K as in Fig. 4. With this structure, reaction of the wheels one upon the other is still further reduced.

A second embodiment, shown in Figs. 5 to 8, inclusive operates basically in the same manner as the first construction but differs therefrom by some structural changes. In this modification the half axle 1' is not connected to the frame by a separate strut member like 22 in Fig. 2. On the other hand, the bar 4 which, as in the first modification, connects the two half axles 1, 1' is connected to the frame. The means for connecting bar 4 to the frame are best shown in Fig. 7 in which a link 26 is joined to bracket 20 on the frame by means of pivot 33. The opposite end of link 26 has a spherical member 27 which cooperates with a spherical opening in bar 4, thereby providing a linkage connection. The link or strut 15 is in this modification connected at its lower end to the bar 4 at a point below its center. Its operation, however, is the same as that shown in Fig. 3. In place of the joining means 6, 8, 9, 10, and 11 for connecting the bar 4 to half axle 1' this modification proposes a simple rubber bearing connection 29 and 30. The operation of these elements is substantially the same. As shown in Fig. 8, the theoretical swinging axis of the half axles will both pass through a common point S.

In order to compensate for the braking reaction on the wheels, the brake bearing members 31 and 31' may be joined to the connecting bar 4 by suitable rods 32, 32'.

Both modifications illustrated provide for a progressive springing action, that is a springing action which will vary in intensity with the amount of load. This is best shown in Figs. 3 and 7 in which the angle B between the link 17 and the strut 15 is a measure of the effective springing. It will be readily seen that as the load on the vehicle is varied, the position of these linkage members will vary and therefore the angle B. The relationship of these links are such that a direct relationship between the amount of load and the intensity of the springing can be maintained.

The terms "frame" or "chassis" as herein used are not to be understood as limited to such devices when formed separate from the body or coach-work of the vehicle, but as including such devices when formed integral with said body or coach-work.

It will be seen therefor that two forms of construction have been disclosed which satisfy the objects stated above and which provide such a construction which is simple and compact, which provides high specific springing in a vehicle, including the ability to traverse rough terrain, possessing good roadability, in which appreciable displacement of the axles due to brake reactions is avoided, in which progressive spring effectiveness is secured and in which a plurality of independently mounted wheels are spring supported by means of a single spring.

Many changes in the disclosed apparatus are possible. The spring used need not be a torsion bar but may be any type of rotary spring. The invention furthermore is not limited for use in conjunction with any particular type of swinging half axle or with any particular type of vehicle. The linkage means shown are merely illustrative of any suitable or similar means that may be used as will occur to those skilled in the art.

The invention is not intended to be limited to the two forms shown, which are to be understood as illustrative only and not as limiting, as various changes in construction and arrangement may be made, all coming within the scope of the claims which follow.

I claim:

1. In a springing means for vehicles having a frame, in combination, a pair of substantially parallel axles having wheels mounted thereon, means for pivotally supporting said axles on said frame, a bar pivotally connected to one axle and resiliently connected to the other axle, a bearing member on said frame, spring means connected at one end to said frame and at the other end in said bearing member and to said bar, and a rod connecting one of said axles to said bearing member, whereby one axle is sprung about a horizontal axis determined by its point of connection to the frame and the pivoted point of the other axle to said bar, and the other axle is sprung about a horizontal axis determined by its point of connection to the frame and the point of connection of the rod to the bearing member.

2. In a springing means for vehicles having a frame, in combination, a pair of substantially parallel axles having wheels mounted thereon, means for pivotally supporting said axles on said frame, a bar pivotally connected to each axle, a bearing member on said frame, spring means connected at one end to said frame and at the other end in said bearing member and to said bar, whereby each wheel is sprung about a horizontal axis determined by its point of connection to the frame and the point of connection of said spring means to said bar.

3. The combination according to claim 2 including means for pivotally connecting said bar to said bearing member.

4. The combination according to claim 2 including braking means on said axles and rods connecting said braking means to said bar, whereby the braking reaction of the wheels is equalized.

5. In a springing means for vehicles having a frame, in combination, a pair of substantially parallel axles having wheels mounted thereon, means for pivotally supporting said axles on said frame, a bar pivotally connected to each axle, spring means connected at one end to said frame and at the other end to an arm, and a link member connecting said arm to said bar, whereby said axles are progressively sprung relative to the frame, the amount of spring reaction depending upon the effective angle between the arm and the link member.

6. The combination according to claim 5 in which said spring means is a torsion bar.

7. The combination according to claim 1 in which said spring means is a torsion bar.

8. The combination according to claim 2 in which said spring means is a torsion bar.

9. In a spring means for vehicles having a frame, in combination, a plurality of substantially parallel axles having wheels mounted thereon, means for supporting said axles to swing relative to said frame about substantially horizontal axes, means including a bar for pivotally connecting said axles with one another, spring means, and an arm and cooperating ball and socket means for joining said spring means to said bar.

10. In a springing means for vehicles having a frame, in combination, a plurality of substantially parallel axles having wheels mounted thereon, means at one end of each of said axles for pivotally supporting said axles each to swing relative to said frame about a substantially horizontal axis, means for pivotally connecting said axles with one another; and torsion spring means joining said connecting means to said frame.

FERDINAND PORSCHE.